United States Patent

Ando et al.

[11] Patent Number: 5,983,650
[45] Date of Patent: Nov. 16, 1999

[54] METHOD AND APPARATUS FOR CONTROLLING VEHICULAR AIR-CONDITIONING SYSTEM

[75] Inventors: Hiroyuki Ando; Kotaro Miyashita; Fumio Hara, all of Utsunomiya; Hirofumi Hara, Tochigi-ken, all of Japan

[73] Assignee: Honda Giken Kogyo Kabushiki Kaisha, Tokyo, Japan

[21] Appl. No.: 09/146,078

[22] Filed: Sep. 2, 1998

[30] Foreign Application Priority Data

Sep. 12, 1997 [JP] Japan .................................. 9-247991

[51] Int. Cl.$^6$ .............................. B60H 1/32; F02D 29/04
[52] U.S. Cl. .............................. 62/133; 62/243; 62/323.4
[58] Field of Search .......................... 62/133, 231, 323.4, 62/228.1, 228.3, 230, 157, 158, 243, 244

[56] References Cited

U.S. PATENT DOCUMENTS

| | | | |
|---|---|---|---|
| 4,556,942 | 12/1985 | Russo et al. ..................... | 62/323.4 X |
| 5,216,895 | 6/1993 | Kawai et al. ..................... | 62/133 |
| 5,644,924 | 7/1997 | Carr et al. ..................... | 62/243 X |
| 5,694,781 | 12/1997 | Peterson ..................... | 62/133 |

FOREIGN PATENT DOCUMENTS 1-147718  10/1988  Japan .
5-44531   2/1993   Japan .

*Primary Examiner*—Harry B. Tanner
*Attorney, Agent, or Firm*—Birch, Stewart, Kolasch & Birch, LLP

[57] ABSTRACT

In order to effectively perform on/off control for an air-conditioning system carried on an automobile during idling operation of the automobile, if a state, in which a difference between a target idling number of revolution and a net idling number of revolution is larger than a preset difference value, is continued for a preset period of time, then an electromagnetic clutch is disconnected, and a compressor is allowed to be in an operation stop state. After that, if the difference is smaller than the preset difference value, and a state, in which the difference is smaller than the preset difference value, is continued for a preset period of time, then the electromagnetic clutch is connected, and the compressor is restored to be in an operating state. By doing so, it is possible to previously avoid the occurrence of vibration of the vehicle body due to vibration of the engine, and the occurrence of booming noise in the vehicle's cabin caused by the vibration. The air-conditioning system is automatically restored to be in the operating state when it is judged that the state of the engine is restored. Therefore, the convenience of use of the air-conditioning system is improved.

9 Claims, 2 Drawing Sheets

METHOD AND APPARATUS FOR CONTROLLING VEHICULAR AIR-CONDITIONING SYSTEM

BACKGROUND OF THE INVENTION

1. Field of the Invention

The present invention relates to a method and an apparatus for controlling a vehicular air-conditioning system, for controlling the operation of the air-conditioning system when an engine of a vehicle such as an automobile is in a racing state, i.e., in a so-called idling state.

2. Description of the Related Art

A control apparatus for a vehicular air-conditioning system has been hitherto known (see Japanese Laid-Open Utility Model Publication No. 1-147718), which is used in order to prevent the stop of an engine, i.e., so-called engine stop during the operation of the air-conditioning system. In this conventional technique, the operation of the air-conditioning system is stopped when the actual idling number of revolution (net idling number of revolution) of the engine is below a lower limit target value of the idling number of revolution. On the other hand, the operation of the air-conditioning system is started again to use the system when the net idling number of revolution is restored to be not less than an upper limit target value of the idling number of revolution.

However, this conventional technique involves the following problem. That is, if the control is performed so that the number of revolution of the engine is lowered when a large load is exerted on the air-conditioning system and a large load is also exerted on the engine, then the rotation of the engine varies between the upper limit target value of the preset number of revolution (number of revolution to restore the air-conditioning system) and the lower limit target value of the preset number of revolution (number of revolution to stop the air-conditioning system), sometimes resulting in occurrence of hunting.

A technique to solve this problem has been suggested in Japanese Laid-Open Patent Publication No. 5-44531. This technique includes a so-called idle-up control means for increasing the idling number of revolution depending on the load exerted on an air-conditioning system when the air-conditioning system is operated. This technique includes an intake amount-correcting means for increasingly correcting the air increment amount value for the idle-up effected by the idle-up control means after the air-conditioning system is allowed to be in a stopped state at the lower limit target value. Incidentally, the idle-up control refers to the control in which the intake amount-correcting means is operated so that the amount of intake air into the engine is increased in response to the operation and the stop of the air-conditioning system during the idling state in order to idle-up the engine.

However, in the technique described in Japanese Laid-Open Patent Publication No. 5-44531, the problem described above is dealt with such that the amount of air is increasingly corrected by using the intake amount-correcting means after the air-conditioning system is in the stopped state to give no load exerted on the engine by the air-conditioning system. Therefore, the so-called boosting phenomenon tends to occur, in which the number of revolution of the engine is quickly increased depending on the air increment correction amount value and the state of the engine. For this reason, it is difficult to set the air increment correction amount value. In this technique, the control is complicated, in which the increment correction is performed, for example, in a stepwise manner. Further, any of the techniques disclosed in Japanese Laid-Open Utility Model Publication No. 1-147718 and Japanese Laid-Open Patent Publication No. 5-44531 involves the following inconvenience. That is, for example, if the number of revolution of the engine is temporarily decreased, due to any cause, to be lower than the lower limit target value in a state in which the air-conditioning system is normally operated with a small load, the air-conditioning system is stopped.

Furthermore, any of the techniques disclosed in Japanese Laid-Open Utility Model Publication No. 1-147718 and Japanese Laid-Open Patent Publication No. 5-44531 involves the following problem. That is, for example, if the decrease in number of revolution of the engine continuously occurs, in which the net idling number of revolution does not arrive at the lower limit target value of the idling number of revolution, and the engine stop does not occur, then, for example, the body of the vehicle makes vibration due to vibration of the engine, or the booming noise occurs in the vehicle's cabin due to the vibration, because the air-conditioning system is continuously operated. As a result, the evaluation of so-called sensory properties is deteriorated.

SUMMARY OF THE INVENTION

The present invention has been made taking such problems into consideration, an object of which is to provide a method and an apparatus for controlling a vehicular air-conditioning system, which makes it possible to effectively perform the on/off control of the air-conditioning system carried on the vehicle during the idling state.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of the present invention will be explained below with reference to the drawings.

Figure 1:
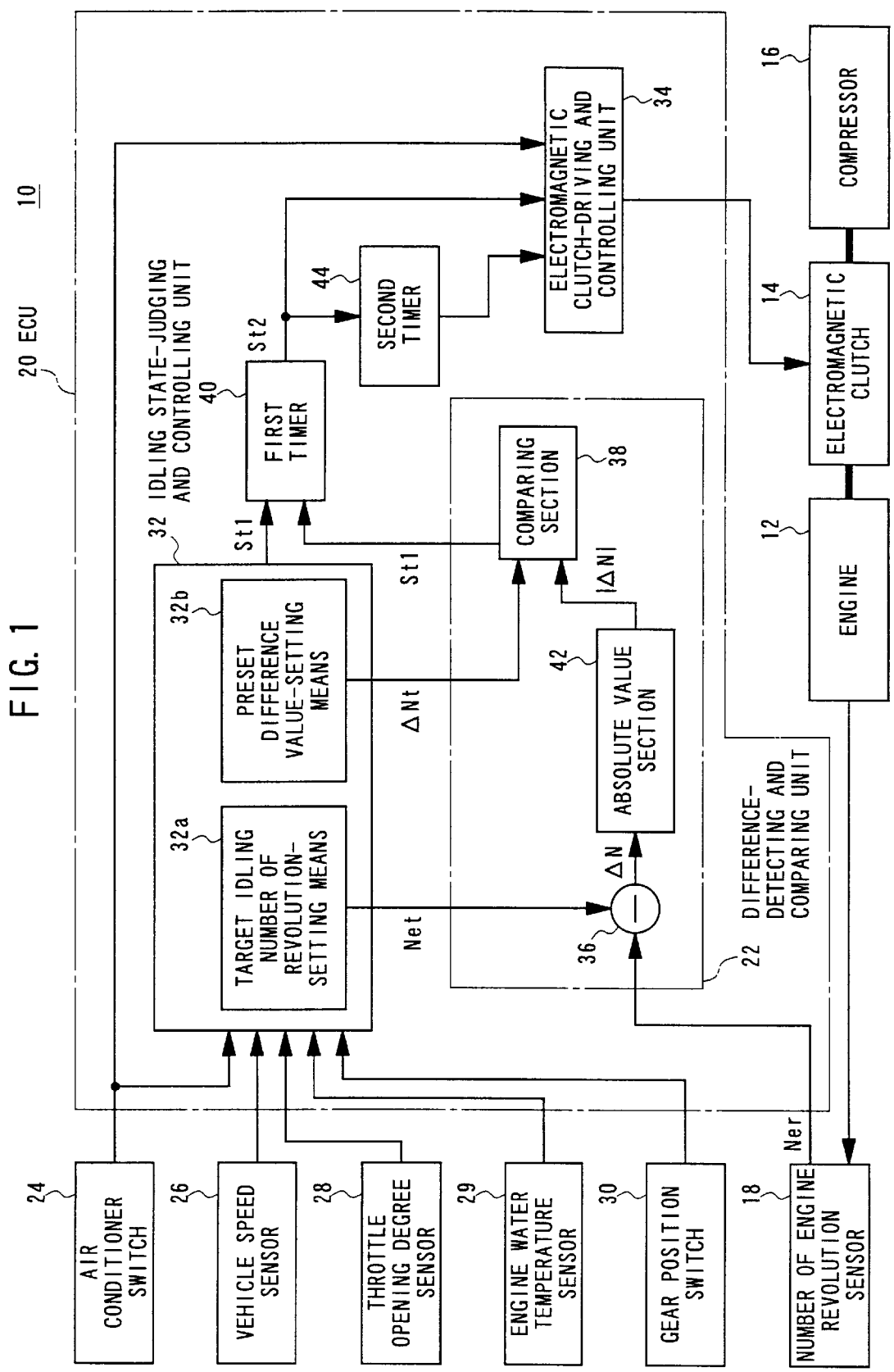
FIG. 1 shows a block diagram illustrating a schematic arrangement of an automobile to which an embodiment of the present invention is applied.

FIG. 1 schematically shows an arrangement of an automobile 10 as a vehicle to which the embodiment of the present invention is applied.

The automobile 10 has an engine 12. The engine 12 is connected, through an electromagnetic clutch 14, to a compressor which constitutes an air-conditioning system.

The actual number of revolution (net number of revolution) Ner of the engine 12 is detected by a number of engine revolution sensor (number of revolution-detecting means) 18, and it is supplied to a difference-detecting and comparing unit 22 which constitutes ECU (electric control unit) 20 including a microcomputer as a control means.

The microcomputer functions, for example, as means for making driving, control, processing, and judgement. As well-known, the microcomputer is provided as an LSI device composed of one integrated chip including, for example, a microprocessor (MPU) corresponding to a central processing unit (CPU), an AD conversion circuit and a DA conversion circuits as input/output devices connected to the microprocessor, an I/O port, a read-only memory (ROM) for previously writing, for example, a control program, a system program, and a look-up table, a random access memory (RAM, read/write memory) for temporarily storing processing data or the like, a timer circuit, and an interrupt processing circuit.

Those supplied to the idling state-judging and controlling unit (idling state-judging unit) 32 which constitutes ECU 20 include an output signal (air conditioner on/off signal) fed from an air conditioner switch (input means for requiring the operation of the air conditioner) 24 as a manual on/off unit for the air-conditioning system (air conditioner) or from a control unit such as an unillustrated automatic air-conditioning system, a vehicle speed signal as an output signal from a vehicle speed sensor (vehicle speed-detecting means) 26 for detecting the number of revolution of wheels, an opening degree signal as an output signal from a throttle opening degree sensor (throttle opening degree-detecting means) 28 which is operated in cooperation with an accelerator pedal, a temperature signal as an output signal from an engine water temperature sensor 29 for detecting the temperature of the cooling water for the engine, and a gear position signal as an output signal from a gear position switch 30 for detecting the gear position. The air conditioner on/off signal, which is the output signal from the air conditioner switch 24, is also supplied to an electromagnetic clutch-driving and controlling unit 34.

In this embodiment, the idling state-judging and controlling unit 32 includes a target idling number of revolution-setting means 32a for outputting a target idling number of revolution Net during the idling state, and a preset difference value-setting means 32b for outputting a preset difference value ΔNt. When the so-called idle-up control is performed as described later on, the target idling number of revolution-setting means 32a may allowed to have different target idling numbers of revolution between the restored state and the stopped state of the air-conditioning system.

In this embodiment, the electromagnetic clutch control means basically comprises a subtracting section 36 as a difference-detecting means, an absolute value section 42, a comparing section 38 as a difference-comparing means, and a first timer (first time-measuring means) 40 and a second timer (second time-measuring means) 44 as time-measuring means.

The idling state-judging and controlling unit 32 outputs the target idling number of revolution Net from the target idling number of revolution-setting means 32a to one input port of the subtracting section 36 which constitutes the difference-detecting and comparing unit 22. The idling state-judging and controlling unit 32 supplies a preset difference value ΔNt from the preset difference value-setting means 32b to a reference port of the comparing section (difference-comparing means) 38. In this embodiment, the preset difference value ΔNt is set to be ΔNt =90 rpm. The preset difference value ΔNt is a number of revolution as a difference at which it is intended not to cause any vibration of the engine. It is noted that the preset difference value ΔNt is different from the number of revolution of the lower limit target value which is a lower limit value of a range of the number of revolution in which the engine stop occurs as explained in the section of the conventional technique.

The idling state-judging and controlling unit 32 supplies a first time measurement start signal St1 to the first timer 40 which can be constructed, for example, by a preset down counter. In this embodiment, the preset time measurement time for the first timer 40 is set to be 10 seconds.

In this embodiment, the preset time measurement time (preset time) for the first timer 40 is set as follows. That is, the time required for the engine to arrive at malfunction is measured beforehand, and the preset time is set to be a period of time with a margin with respect to the time required to arrive at the malfunction. For example, the preset time is set to be a half period of time thereof.

The net number of engine revolution Ner is supplied to the other input port of the subtracting section 36. An absolute value (difference) |ΔN| of a difference signal (difference) ΔN (ΔN=Net−Ner) between the net number of engine revolution Ner and the target idling number of revolution Net is supplied through the absolute value section 42 to the comparing port of the comparing section 38.

That is, in this embodiment, the subtracting section 36 as the difference-detecting means and the absolute value section 42 are used to detect the difference |ΔN| between the net number of engine revolution Ner detected by the number of engine revolution sensor 18 as the number of revolution-detecting means and the target idling number of revolution Net set by the target idling number of revolution-setting means 32a. The difference |ΔN| is supplied to the comparing section 38 as the difference-comparing means. The comparing means 38 compares the difference |ΔN| detected by the difference-detecting means and the preset difference value ΔNt set by the preset difference value-setting means 32b.

The comparing section 38 provides the first time measurement start signal St1 as an output signal which is a comparison result signal of the comparing section 38. The first time measurement start signal St1 is supplied to the first timer 40.

A second time measurement start signal St2, which is an output signal of the first timer 40, is supplied to the second timer 44 which is constructed by the preset down counter. The second time measurement start signal St2 is also supplied as a disconnecting signal for the electromagnetic clutch 14 to the electromagnetic clutch-driving and controlling unit 34. The preset time measurement time for the second timer 44 is set to be 10 seconds in this embodiment. In this embodiment, the preset time measurement time (preset time) for the second timer 44 is a period of time obtained by adding a certain period of margin time to a previously measured period of time required to restore the engine 12. The preset time is set to be a period of time which makes it possible to maintain a state in which the passenger does not feel uncomfortable due to the operation stop of the air-conditioning system.

An output signal of the second timer 44 serves as a connecting signal for the electromagnetic clutch 14 which is in the disconnected state. The output signal of the second timer 44 is supplied to the electromagnetic clutch-driving and controlling unit 34.

The electromagnetic clutch-driving and controlling unit 34 disconnects or connects the electromagnetic clutch 14 depending on the disconnecting signal and the connecting signal so that the compressor 16 and the engine 12 are in a disconnected state or in a coupled state.

Figure 2:
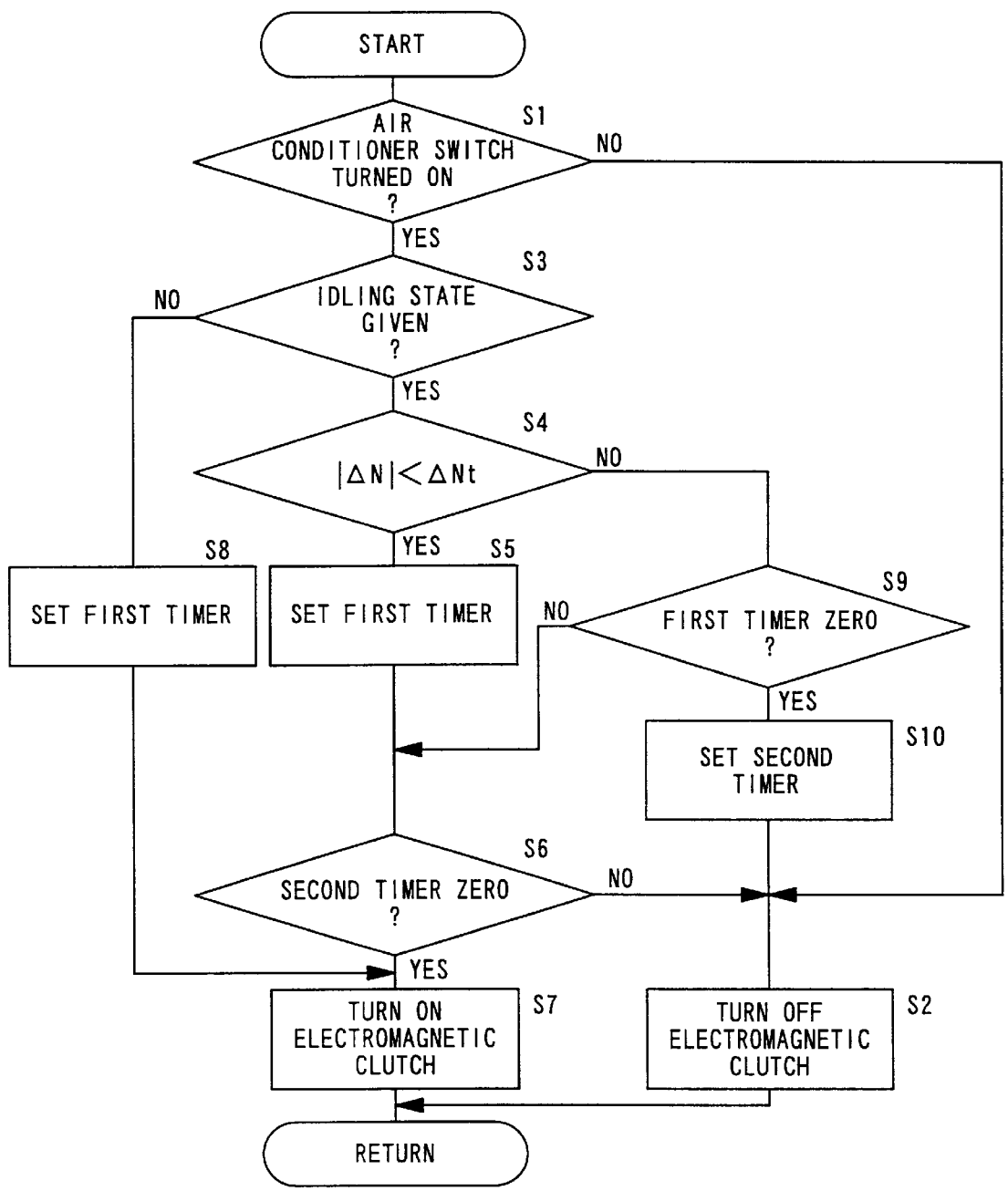
FIG. 2 shows a flow chart for depicting the operation of the illustrative system shown in FIG. 1.

Next, the operation of the illustrative system shown in FIG. 1 will be explained in detail below with reference to a flow chart shown in FIG. 2. It is noted that the subject of judgement, processing, and control is ECU 20.

At first, the idling state-judging and controlling unit 32 judges the on/off state of the air conditioner switch 24 (step S1). If the air conditioner stitch 24 is in the off-state, the electromagnetic clutch 14 is in the disconnected state by the aid of the electromagnetic clutch-driving and controlling unit 34 (step S2). The compressor 16, in other words, the air-conditioning system is in the operation stop state. After that, the routine returns to the judgement in the step S1.

On the other hand, if the judgement in the step S1 is affirmative, namely if the air conditioner switch 24 is in the on-state, then it is judged whether or not the automobile 10 is in the idling state (state in which the engine races) (step S3).

In this embodiment, the idling state is judged on the basis of the following conditions. That is, the vehicle speed detected by the vehicle speed sensor 26 has a value of zero, in other words, the automobile 10 is in the stopped state. The opening degree of the throttle valve detected by the throttle opening degree sensor 28 has a value of zero. In the case of an automatic transmission automobile, the gear position switch 30 is at the so-called parking position P or at the neutral position N. The engine water temperature is not less than 40° C. The automobile is not in the first idling state (warming-up operation mode).

In the case of a so-called MT (manual transmission) automobile, the condition for judging the idling state is that the gear is at the neutral position, in place of the condition based on the gear position switch 30.

If it is decided that the idling state is given, the difference-detecting and comparing unit 22 judges whether or not the absolute value $|\Delta N|=|Net-Ner|$ of the difference $\Delta N=Net-Ner$ between the net number of engine revolution (net idling number of revolution in this embodiment) Ner detected by the number of engine revolution sensor 18 and the target idling number of revolution Net set by the idling state-judging and controlling unit 32 is smaller than the preset difference value $\Delta Nt$ ($\Delta N=90$ rpm in this embodiment) set by the idling state-judging and controlling unit 32 (step S4).

It is herein assumed that the engine 12 is stably rotated, the difference $|\Delta N|$ between the net idling number of revolution (actual idling number of revolution) Ner and the target idling number of revolution Net is smaller than the preset difference value $\Delta N$, and the judgement in the step S4 holds.

On this assumption, the first timer 40 is reset, and then it is set in accordance with the first time measurement start signal St1 outputted from the comparing section 38 to start the time measurement for the preset period of time (preset time) of 10 seconds (step S5).

Next, ECU 20 confirms whether or not the time measurement time obtained by using the second timer 44 is zero second or at a value provided during the measurement (period of time exceeding zero second and less than 10 seconds) (step S6).

At this point of time, the second timer 44 does not start the time measurement, and hence zero second is given. Therefore, the judgement is affirmative. The electromagnetic clutch 14 is in the connected state by the aid of the electromagnetic clutch-driving and controlling unit 34 in response to the output level of the first timer 40 (step S7), giving a state in which the compressor 16 is rotated by the engine 12. Thus, the operation of the air-conditioning system is started. After that, the routine returns to the judgement process in the step S1. The time, in which the processes of the step S1 and the steps S3 to S7 or the processes of the steps S1 and S2, is a period of time in an order of ms.

If it is judged that the idling state is not given in the judging process in the step S3 described above, the first timer 40 is set. The electromagnetic clutch 14 is allowed to be directly in the connected state in accordance with the concerning output level. Thus, the air-conditioning system is in the operating state (step S8). Every time when the process in the step S5 or the step S8 is performed, the first timer 40 is reset. The time measurement for 10 seconds is set again. The down time measurement starting from 10 seconds (for example, 10 seconds, 9.9 seconds, . . . ) is started. The following situation is assumed. That is, during the process executed in the order of steps S1, S3, S4, S5, S6, and S7, in other words, when the proper air-conditioning control is performed, the absolute value $|\Delta N|=|Net-Ner|$ of the difference $\Delta N=Net-Ner$ between the net idling number of revolution Ner and the target idling number of revolution Net has a value larger than the preset difference value $\Delta N$, due to any factor (step S4: NO). That is, a situation is assumed, in which it is judged that the net idling number of revolution Ner of the engine 12 exceeds the proper range when the air-conditioning system is operated during the idling state.

In this case, it is judged whether or not the measurement time obtained by using the first timer 40 has elapsed the preset time of 10 seconds. That is, it is judged whether or not the output value of the first timer 40 is zero second (step S9).

If the period of time, in which the net idling number of revolution Ner exceeds the proper range, exceeds 10 seconds, in other words, if the time measured by the first timer 40 exceeds the preset period of time of 10 seconds (step S9: YES) during the repeated process effected in the order of the steps S1, S3, S4, S9, S6, and S7, then the time measurement termination signal of the first timer 40 is supplied to the second timer 44, as a second time measurement start signal St2 for starting the down time measurement effected by the second timer 44. Thus, the second timer 44 starts the down time measurement for 10 seconds (step S10). Further, the electromagnetic clutch 14 is allowed to be in the disconnected state in accordance with the time measurement termination signal (disconnecting signal) of the first timer 40 (step S2).

When the electromagnetic clutch 14 is in the disconnected state, the process is repeated in the order of the steps S2, S1, S3, S4, S9, and S10.

It is noted that the load on the engine 12 is mitigated when the electromagnetic clutch 14 is disconnected. On this condition, the number of revolution of the engine 12 is increased, and the net idling number of revolution Ner intends to return to be in the proper range.

If the net idling number of revolution Ner of the engine 12 returns to be in the proper range, and the judgement process in the step S4 holds, in other words, if the absolute value $|\Delta N|=|Net-Ner|$ of the difference $\Delta N=Net-Ner$ between the net idling number of revolution Ner and the target idling number of revolution Net has a value smaller than the preset difference value $\Delta Nt$ (step S4: YES), then the first timer 40 is set again, and the down time measurement for 10 seconds is started (step S5).

If the judging process in the step S6 holds (the measurement time of the second timer 44 is 10 seconds, i.e., the output value of the second timer 44 is zero second) at the point of time at which the down time measurement for 10 seconds by the second timer 44 is completed after the second timer 44 is set in the step S10 to allow the electromagnetic clutch 14 to be in the disconnected state, in particular, at the point of time at which the down time measurement for 10 seconds by the second timer 44 is completed during the repeated process of the steps S2, S1, S3, S4, S5, and S6, then the net idling number of revolution Ner of the engine 12 returns to be in the proper range, and it is judged that the sufficient time (10 seconds of the preset time for the second timer 20 in this embodiment) has elapsed.

At this time, the time measurement termination signal of the second timer 44 is supplied as the signal for connecting the disconnected electromagnetic clutch 14 to the electromagnetic clutch 14 through the electromagnetic clutch-driving and controlling unit 34. Thus, the engine 12 is connected to the compressor 16 via the electromagnetic clutch 14, giving the state again in which the compressor 16 is operated by the engine 12. The air-conditioning system is restored to be in the actual operating state (step S7).

As described above, according to the foregoing embodiment, if the air conditioner switch 24 is in the on-state, the engine 12 is connected to the compressor 16 via the electromagnetic clutch 14, and the air-conditioning system is in the operating state, then the idling state-judging and controlling unit 32 is used to judge that the automobile 10 is in the idling state, and thereafter the actual number of revolution of the engine 12 detected by the number of engine revolution sensor 18 is detected as the net idling number of revolution Ner.

It is detected whether or not the absolute value $|\Delta N|$ of the difference $\Delta N$ between the detected net idling number of revolution Ner and the target idling number of revolution Net is smaller than the preset difference value $\Delta$Nt. If the former is larger than the latter, the down time measurement for 10 seconds is started by using the first timer 40. If this state is continued for 10 seconds, it is simulated that an abnormal state occurs before occurrence of any actual abnormal state such as engine stop. The electromagnetic clutch 14 is allowed to be in the disconnected state, and air-conditioning system is allowed to be in the operation stop state (paused state). Such simulation makes it possible to previously prevent occurrence of any abnormal state such as engine stop.

Next, when it is simulated that the abnormal state occurs to allow the electromagnetic clutch 14 to be in the disconnected state, the down time measurement for 10 seconds is simultaneously started by using the second timer 44. In this situation, if the state is continued, in which the absolute value $|\Delta N|$ of the difference $\Delta N$ between the detected net idling number of revolution Ner and the target idling number of revolution Net is larger than the preset difference value $\Delta N$, then the down time measurement is newly started every time when such a state occurs, by using the second timer 44.

In the situation as described above, if the absolute value $|\Delta N|$ of the difference $\Delta N$ between the detected net idling number of revolution Ner and the target idling number of revolution Net has a value smaller than the preset difference value $\Delta N$, and if the down time measurement by the second timer 44 is 10 seconds of the preset time, then it is judged that the engine 12 is connected to the compressor 16, and the system returns to be in the normal state. The electromagnetic clutch 14 is allowed to be in the on-state again. Accordingly, the air-conditioning system is operated again.

That is, according to this embodiment, if the net idling number of revolution Ner of the engine 12 is deviated by a certain period of time (10 seconds) from the target number of revolution Net during the idling state in which the air-conditioning system is operated, the electromagnetic clutch 14 is automatically disconnected. Thus, it is possible to previously avoid occurrence of any abnormal state such as engine stop, vibration of the vehicle body, and occurrence of booming noise or the like based on the vibration. Further, if the state of the engine 12 is sufficiently restored, and the state, in which the difference between the net idling number of revolution Ner of the engine 12 and the target idling number of revolution Net is within the range of the certain value (step S4: YES), is continued for the certain period of time (10 seconds), then the engine 12 is automatically connected to the compressor 16. Thus, the air-conditioning system is in the operating state. The control performed as described above makes it possible to achieve the effect that the operation stop period for the air-conditioning system is an extremely short period of time.

In the embodiment described above, the target idling number of revolution Net, the preset difference value $\Delta N$, the preset time set for the first timer 40, and the preset time set for the second timer 44 can be set to have desired values by using an unillustrated input means.

The embodiment described above does not refer to the relationship with respect to the so-called idle-up control in order to avoid complicated explanation. However, if the air-conditioning system is in the operating state (step S1: YES), and the idling state is given (step S3: YES), then the idle-up control can be simultaneously used, in which an unillustrated idle speed control valve (ISCV) is subjected to feedback control to be opened and closed depending on the load on the air-conditioning system so that the amount of air flowing through the bypass passage is regulated to increase the idling number of revolution. When the idle-up control is simultaneously used, then the target idling number of revolution Net, which is set by the target idling number of revolution-setting means 32a, may be set, for example, to have different values such that the target idling number of revolution Net is 1050 rpm when the air-conditioning system is restored from the operation stop state (stopped state) to the operating state, and the target idling number of revolution Net is 800 rpm when the system is switched from the operating state to the stopped state. Alternatively, the target idling number of revolution Net may be set to have the same value of 800 rpm for the both cases. The preset values can be determined depending on the output characteristics of the engine 12.

As explained above, according to the present invention, if the state, in which the difference between the target idling number of revolution and the net idling number of revolution is larger than the preset difference value, is continued for the preset period of time, then the electromagnetic clutch is disconnected, and the air-conditioning system is allowed to be in the operation stop state.

Accordingly, the number of revolution of the engine, at which the operation of the air-conditioning system is stopped, can be set to be higher than the conventional lower limit-target value. It is possible to avoid the situation in which the number of revolution is continued in the degree in which the net idling number of revolution of the engine does not arrive at the lower limit target value of the idling number of revolution. As a result, the effect is achieved in that it is possible to previously avoid the occurrence of vibration of the vehicle body due to vibration of the engine, and the occurrence of booming noise in the vehicle's cabin caused by the vibration.

As described above, according to the present invention, it is possible to effectively perform the on/off control for the air-conditioning system carried on the vehicle during the idling state.

Therefore, an additional effect is achieved in that the evaluation of sensory properties of the vehicle to which the present invention is applied is improved.

According to the present invention, if the period of time, in which the difference between the target idling number of revolution and the net idling number of revolution is larger than the preset difference value, is continued for the preset period of time, then the electromagnetic clutch is disconnected, and the air-conditioning system is allowed to be in the operation stop state. After that, if the difference becomes smaller than the preset difference value, and the period of time, in which the former is smaller than the latter, is continued for the preset period of time, then the electromagnetic clutch is connected, and the air-conditioning system is restored to be in the operating state.

Accordingly, in contrast to the conventional technique, when the load exerted on the air-conditioning system is large, and the load exerted on the engine is also large, then the hunting, which would be otherwise caused due to the variation of the number of revolution of the engine between the preset number of revolution for turning on the air conditioner (upper limit target value) and the preset number of revolution for turning off the air conditioner (lower limit target value), is prevented by using the difference between the target idling number of revolution and the net idling number of revolution. Therefore, unlike the conventional technique, it is possible to perform the idle-up control without involving any complexity. Further, even if the number of revolution of the engine is temporarily lowered below the lower limit value due to any cause in the state in which the system is normally operated while the load on the air conditioner is small, the air conditioner is not stopped. Therefore, the air-conditioning system is continuously operated as compared with the conventional technique. The air-conditioned state in the vehicle's cabin is maintained, and the comfortable state is not deteriorated.

Further, the number of revolution of the engine for stopping the operation of the air-conditioning system can be set to be higher than the conventional lower limit target value. Therefore, it is possible to avoid the situation in which the number of revolution of the degree, in which the net idling number of revolution of the engine does not arrive at the lower limit target value of the idling number of revolution, is continued for a long period of time. As a result, the effect is achieved, in which it is possible to previously prevent the occurrence of vibration of the vehicle body due to vibration of the engine, and the occurrence of booming noise in the vehicle's cabin caused by the vibration. If the state, in which the difference between the net idling number of revolution and the target idling number of revolution is smaller than the preset difference value, is continued for the preset period of time, it is possible to set the system such that the air-conditioning system is automatically restored again in a short period of time to be in the operating state. Therefore, the convenience of use of the air-conditioning system is extremely improved.

As a result, the period of time, in which the operation of the air-conditioning system is stopped, is shortened. The air-conditioned state in the vehicle's cabin is maintained, and the comfortable state is not deteriorated. It is possible to effectively perform the on/off control for the air-conditioning system carried on the vehicle during the idling state.

Therefore, the additional effect is achieved, in which the evaluation of sensory properties of the vehicle to which the present invention is applied is further improved.

It is a matter of course that the present invention is not limited to the embodiment described above, which may be embodied in other various forms without deviating from the gist or essential characteristics of the present invention.

What is claimed is:

1. A method for controlling a vehicular air-conditioning system in which said air-conditioning system is subjected to on/off control during idling rotation of an engine, said method comprising:

an idling number of revolution-detecting step of detecting a net idling number of revolution of said engine;

a difference value-detecting step of detecting a difference value between said detected net idling number of revolution of said engine and a target idling number of revolution;

a comparing step of comparing said detected difference value with a preset difference value;

a time-measuring step of starting time measurement if said preset difference value is larger than said difference value as a result of said comparison, and measuring time for a predetermined preset period of time; and a step of allowing said air-conditioning system to be in an off-state at a point of time of completion of said time measurement for said preset period of time effected in said time-measuring step.

2. The method according to claim 1, wherein said predetermined preset period of time in said time-measuring step is shorter than a period of time ranging from a point of time at which said difference value between said target idling number of revolution and said net idling number of revolution exceeds said preset difference value to a point of time at which said engine generates uncomfortable vibration resulting in malfunction.

3. The method according to claim 1, further comprising, after turning off said air-conditioning system:

an idling number of revolution-detecting step of detecting a net idling number of revolution of said engine;

a difference value-detecting step of detecting a difference value between said detected net idling number of revolution of said engine and a target idling number of revolution;

a comparing step of comparing said detected difference value with a preset difference value;

a time-measuring step of performing time measurement for a predetermined period of restoring preset time if said preset difference value is smaller than said difference value as a result of said comparison; and a step of restoring said air-conditioning system to be in an on-state at a point of time of completion of said time measurement for said period of restoring preset time effected in said time-measuring step.

4. The method according to claim 3, wherein said target idling number of revolution in said difference-detecting step, which is used when said air-conditioning system is restored from said off-state to said on-state, is set to be a number of revolution higher than said target idling number of revolution which is used when said air-conditioning system is switched from said on-state to said off-state.

5. The method according to claim 3, wherein said predetermined period of restoring preset time in said time-measuring step, which is used when said air-conditioning system is restored from said off-state to said on-state, is a period of time longer than a previously measured period of time for said engine to make restoration.

6. An apparatus for controlling a vehicular air-conditioning system, comprising:

a compressor connected to an vehicular engine for being driven;

an electromagnetic clutch for connecting said compressor to said vehicular engine;

a number of revolution-detecting means for detecting a number of revolution of said vehicular engine;

a target idling number of revolution-setting means for setting a target idling number of revolution for said vehicular engine during idling operation; and an electromagnetic clutch control means for controlling connection of said electromagnetic clutch on the basis of said number of revolution detected by said number of revolution-detecting means and said target idling number of revolution set by said target idling number of revolution-setting means, said electromagnetic clutch control means comprising:

a difference-detecting means for detecting a difference between said number of revolution detected by said number of revolution-detecting means and said target number of revolution set by said target idling number of revolution-setting means;

a difference-comparing means for comparing said difference detected by said difference-detecting means with a predetermined preset difference value; and a time-measuring means for measuring a predetermined preset period of time, depending on a result of said comparison effected by said difference-comparing means, wherein:

said time-measuring means generates a disconnecting signal for said electromagnetic clutch after a state, in which said difference detected by said difference-detecting means is larger than said preset difference value, is continued for said preset period of time.

7. The apparatus according to claim 6, wherein said preset period of time for said time-measuring means is shorter than a period of time ranging from a point of time at which said difference value between said target idling number of revolution and a net idling number of revolution exceeds said preset difference value to a point of time at which said engine generates uncomfortable vibration resulting in malfunction.

8. An apparatus for controlling a vehicular air-conditioning system, comprising:

a compressor connected to an vehicular engine for being driven;

an electromagnetic clutch for connecting said compressor to said vehicular engine;

a number of revolution-detecting means for detecting a number of revolution of said vehicular engine;

a target idling number of revolution-setting means for setting a target idling number of revolution for said vehicular engine during idling operation; and an electromagnetic clutch control means for controlling connection of said electromagnetic clutch on the basis of said number of revolution detected by said number of revolution-detecting means and said target idling number of revolution set by said target idling number of revolution-setting means, said electromagnetic clutch control means comprising:

a difference-detecting means for detecting a difference between said number of revolution detected by said number of revolution-detecting means and said target number of revolution set by said target idling number of revolution-setting means;

a difference-comparing means for comparing said difference detected by said difference-detecting means with a predetermined preset difference value; and first and second time-measuring means for measuring first and second preset periods of time respectively, depending on a result of said comparison effected by said difference-comparing means, wherein:

said first time-measuring means generates a disconnecting signal for said electromagnetic clutch after a state, in which said difference detected by said difference-detecting means is larger than said preset difference value, is continued for said first preset period of time; and said second time-measuring means generates a connecting signal for said electromagnetic clutch if said difference detected by said difference-detecting means is smaller than said preset difference value, after a state, in which said difference detected by said difference-detecting means is smaller than said preset difference value, is continued for said second preset period of time, after said electromagnetic clutch is disconnected.

9. The apparatus according to claim 8, wherein:

said first preset period of time is shorter than a period of time ranging from a point of time at which said difference value between said target idling number of revolution and a net idling number of revolution exceeds said preset difference value to a point of time at which said engine generates uncomfortable vibration resulting in malfunction; and said second preset period of time is longer than a previously measured period of time required for said engine to make restoration.

* * * * *